(12) United States Patent
Jafri et al.

(10) Patent No.: US 8,278,370 B1
(45) Date of Patent: Oct. 2, 2012

(54) FRICTION SURFACE FOR WET CLUTCH

(75) Inventors: Firoz Jafri, Wooster, OH (US); Martin Fuss, Wooster, OH (US); Michael Wilfong, Burbank, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 192 days.

(21) Appl. No.: 12/715,173

(22) Filed: Mar. 1, 2010

Related U.S. Application Data

(60) Provisional application No. 61/208,790, filed on Feb. 27, 2009.

(51) Int. Cl.
*C08J 5/14* (2006.01)

(52) U.S. Cl. ........ 523/152; 523/149; 523/153; 523/155; 523/156; 523/157; 523/158; 524/35; 524/443; 524/448

(58) Field of Classification Search ................. 523/149, 523/152, 153, 155, 156, 157, 158
See application file for complete search history.

(56) References Cited

U.S. PATENT DOCUMENTS

| | | | | |
|---|---|---|---|---|
| 3,092,595 A | * | 6/1963 | Smith et al. | 523/158 |
| 5,676,577 A | * | 10/1997 | Lam et al. | 442/60 |
| 6,534,565 B1 | | 3/2003 | Gardner et al. | |
| 2002/0058728 A1 | * | 5/2002 | Takahara et al. | 523/149 |

\* cited by examiner

*Primary Examiner* — Vickey Nerangis
(74) *Attorney, Agent, or Firm* — Davidson, Davidson & Kappel, LLC

(57) ABSTRACT

A friction lining made of a fibrous mixture with fillers and resin for a wet clutch. In order to design the friction lining able to withstand the higher torque to be transmitted, it is proposed to admix further filler with a Mohs hardness greater or equal to 9.0 and smaller or equal to 9.5 in addition to the ingredients of aramid fibers, cellulose fibers, phenol resin and amorphous silicon dioxide and first filler.

8 Claims, 1 Drawing Sheet

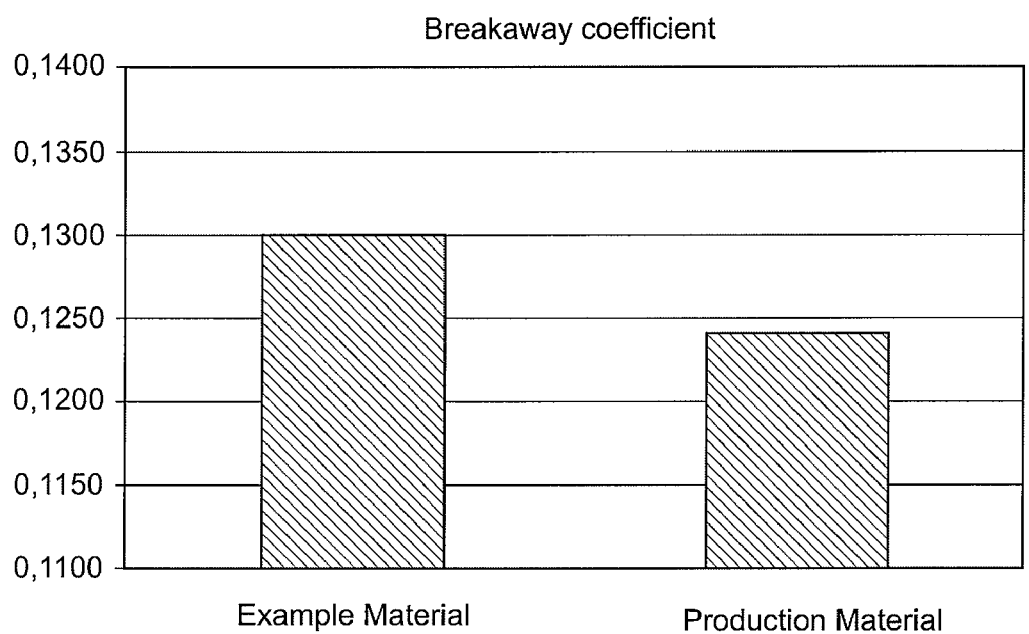

FRICTION SURFACE FOR WET CLUTCH

Priority to U.S. Provisional Patent Application Ser. No. 61/208,790, filed Feb. 27, 2009, is claimed, the entire disclosure of which is hereby incorporated by reference herein.

The invention relates to friction lining, particularly for a wet clutch containing fibrous materials, resins and fillers.

BACKGROUND

Such friction linings are familiar, for instance, from U.S. Pat. No. 6,534,565 B1, as the so-called paper-based linings, particularly for application as friction linings in wet clutches like converter lockup clutches, etc. Among others, the manufacturing process entails pressing a thin friction lining made of a mixture of cellulose fibers, aramid (a thermosetting resin) fibers, fillers and resin in a hot-pressing process; the lining is subsequently stuck on a wet clutch disc. By pressing the disc with friction surface against a mating surface, the torque to be transmitted will be transmitted partly by setting default slip, in particular during the closing and opening states of the wet clutch.

With an increase in torque to be transmitted by the wet clutch, the demands posed on the properties of friction surfaces increase in the process, in particular on their durability under high-pressure. Thus, the properties of ingredients like fillers, which normally decisively influence the coefficient of friction, are not adequate.

SUMMARY OF THE INVENTION

An object of the present invention is to provide a friction lining, in particular for wet clutches, which features a longer service life. Furthermore, the friction lining shall be capable of being manufactured cost effectively by selecting appropriate ingredients.

An object of the present invention provides a friction lining particularly for a wet clutch containing aramid fibers, cellulose fibers, phenol resin, a first filler and a further filler, the further filler having a Mohs hardness greater or equal to 9.0 and smaller or equal to 9.5.

BRIEF DESCRIPTION OF THE DRAWINGS

The FIGURE shows a breakaway coefficient of an example material and a production material.

DETAILED DESCRIPTION

An embodiment of the present invention provides a friction lining, in particular for a wet clutch comprising the ingredients—aramid fibers, cellulose fibers, phenol resin, a first filler and a second filler with Mohs hardness greater or equal to 9.0 and smaller or equal to 9.5. Amorphous silicon dioxide, for instance, in the form of diatomaceous earth may be the first filler. The use of silicon carbide as the second filler has proven itself in that it features obvious advantages with regard to abrasion properties in contrast to aluminum oxides, in particular rhombohedral aluminum oxides like corundum. For instance, findings show that silicon carbide acts much less abrasively than aluminum oxides on the preferably metallic mating surface of a wet clutch. The abrasive effect of aluminum oxides can be minimized, though partially, by using silicon resins. Since silicon resin is significantly more expensive than phenol resins, a significant cost advantage is gained. However, the effectiveness in using the pairing—silicon carbide as filler with phenol resins as bonding material—of the friction lining is advantageous. Moreover, there is strong dependency, of the second filler on the mating surface of further fillers like the second filler, with regard to the abrasive effect. It has been proved that friction linings with values greater than 10% by weight of the second filler are unsuitable due to their strong abrasive effect and lead to severe abrasion of the mating surface. By setting a percentage by weight smaller than 10%, preferably smaller than 6%, adequate durability and coefficient of friction have resulted for higher torque values to be transmitted by a wet clutch, so that contact forces, for instance, up to 10 MPa can be applied to the friction lining, in order to transmit the necessary torque.

Thus, the quality of aramid fibers has a decisive influence with respect to porosity of the friction linings even at large contact forces, and at increased temperatures in particular during slip, in order to ensure coolant flow even when the friction lining is under pressure and in order to minimize glazing on the friction lining. Aramid fibers for this purpose are particularly advantageous with a CSF-value (Canadian Standard Freeness Value) between 550 and 650.

An advantageous friction lining contains the following within the specified ranges in ratio by weight based on 100%:
30% to 60% Cellulose fibers,
10% to 20% Aramid fibers,
15% to 45% First filler, and
1% to 10% Further filler with Mohs hardness greater or equal to 9.0 and smaller or equal
9.5, preferably silicon carbide,
with a further 15% to 44% Phenol resin as an add-on.

A particularly advantageous friction lining contains the following in ratio by weight, based on 100%:
45% Cellulose fibers,
15% Aramid fibers,
35% Amorphous silicon dioxide, and
5% Silicon carbide,
with a further 33% Phenol resin as an add-on.

In this case, cellulose fibers and aramid fibers are meant for basic porous structure formation that is permeable to coolant. The aramid fibers feature a good pressure and temperature resistance and participate in the formation of the coefficient of friction, just like the cellulose fibers. The first filler caters for resistance of friction lining and good distribution of phenol resins in the friction lining mixture. The other filler caters particularly for good pressure resistance of friction lining and for an increase in friction coefficient. The phenol resin acts as a cost effective binding material. The ingredients of the proposed friction lining are easy to mix and homogenize so that single layered friction linings can be depicted with lateral and same properties that remain constant across their thickness.

The FIGURE shows results from a breakaway test at 1.7 MPa facing pressure and 5 RPM slip speed. The particularly advantageous friction lining discussed above in paragraph
is compared to a standard material used in production in dampers and dual mass flywheels.

What is claimed is:

1. A friction lining containing, based on 100% percentage by weight, the following ranges:
   30% to 60% cellulose fibers,
   10% to 20% aramid fibers,
   15% to 45% an amorphous silicon dioxide, and
   1% to 10% a silicon carbide having a Mohs hardness greater than or equal to 9.0 and smaller than or equal to 9.5,
   with a further 15% to 44% phenol resin add-on.

2. The friction lining as recited in claim 1 wherein the amorphous silicon dioxide is a diatomaceous earth.

3. The friction lining as recited in claim 1 wherein the friction lining contains the silicon carbide in a proportion smaller than 10% in percentage by weight.

4. The friction lining as recited in claim 3 wherein the friction lining contains silicon carbide in a proportion smaller than 6% in percentage by weight.

5. The friction lining as recited in claim 1 wherein the aramid fibers have a CSF-value between 550 and 650.

6. The friction lining as recited in claim 1 wherein the friction lining features the following composition in percentage by weight:

45% cellulose fibers,
15% aramid fibers,
35% amorphous silicon dioxide, and
5% silicon carbide,
with a further 33% phenol resin add-on.

7. The friction lining as recited in claim 6 wherein the amorphous silicon dioxide is a diatomaceous earth.

8. The friction lining as recited in claim 1 wherein the friction lining is for a wet clutch.

* * * * *